April 4, 1967     W. E. KAROW ETAL     3,312,143
PHOTOGRAPHIC METHOD AND SYSTEM

Filed Aug. 17, 1964     3 Sheets-Sheet 1

INVENTORS.
WILLIAM E. KAROW
LEWIS E. SIMPSON
BY Albert Rosen

ATTORNEY.

INVENTORS.
WILLIAM E. KAROW
LEWIS E. SIMPSON
BY Albert Rosen
ATTORNEY.

United States Patent Office 3,312,143
Patented Apr. 4, 1967

3,312,143
PHOTOGRAPHIC METHOD AND SYSTEM
William Eugene Karow, 7367 W. 93rd Place, Los Angeles, Calif. 90045, and Lewis Edward Simpson, 255 W. 234th St., Wilmington, Calif. 90744
Filed Aug. 17, 1964, Ser. No. 390,035
16 Claims. (Cl. 88—24)

This invention relates to an improved photographic method and system, and while not limited thereto, proves especially advantageous in connection with photocopying or microfilming apparatus.

In the photocopying of documents, for example in the microfilming of drawings, correspondence, and related materials, it is desirable to have the photocopying apparatus relatively compact. The compactness improves the portability of the apparatus, usually contributes to a reduction in its cost, and in general improves the quality of the resultant photographic image by minimizing the need for relatively large structures prone to vibration. However, if the photocopy apparatus is to be relatively compact, especially if its light source is to be integral with the apparatus, this light source should be disposed relatively close to the document or other material to be copied.

One of the more important considerations in such a system having its own light source, is that the document or other material should be uniformly or flatly illuminated, else the resultant photocopy will be non-uniformly exposed. Thus the distance between the light source and the near side of the material should not appreciably differ from the distance between the light source and the far side of the material—otherwise the near side would receive appreciably more light than the far side. A further problem, compounding the problem of lighting uniformity, is one of the specular reflection. If the angular distance between a light ray emanating directly from any part of the light source, and its reflection from the material to be copied and through the lens system to the film, is less than about 44 degrees, there will be a tendency for the light source itself to be imaged (though perhaps out of focus) on the film along with the material to be copied. Thus the light source must be located at a sufficient distance to one side of the optical center of the lens system to avoid this specular reflection problem. On the other hand, to provide greatest light uniformity over the material to be copied, it is desirable to locate the light source relatively close to the optical center in order to better assure more uniform distribution of light from the light source onto the material; i.e. since illuminance varies inversely with the square of the distance from the light source, the light source should usually be located at a relatively great distance away from the material so as to minimize the relative difference of the distances between the light source and the near and far sides of the material to be copied.

Previous solutions to these problems have not proven entirely satisfactory. This is because the uniform or flat lighting requirement has usually resulted in relatively large sizes of photocopying equipment, due to the necessity of having the light sources physically located an appreciable distance from the material to be copied. Alternate solutions to the size problem have usually proven relatively expensive and complex due to the provision of an appreciable number of independent light sources, or of diffusion screens, to provide the required relatively flat lighting.

Accordingly, one of the objects of the invention is to provide improved photographic copying means characterized in relative portability, compactness, and low cost.

Another object of this invention is to provide improved apparatus for microfilming documents and containing an integral photographic light source, and wherein the apparatus exhibits a relatively small bulk.

Yet another object of this invention is to provide improved and relatively compact microfilming means having self-contained illumination means free of diffusion screens, and capable of providing photographic copy substantially free of both specular reflection and non-uniform exposure problems.

The foregoing and related objects are realized in one embodiment of photocopying means according to the invention that includes a variable density filter to assure that light transmission from the material to be copied is recorded uniformly by copying film. The embodiment includes a light source to provide the required illumination. The light source is disposed to one side of an object-region adapted to contain the material or document to be copied. (The light source is preferable in two parts, with each part on an opposite side of the lens.) The lens, which typically takes the form of a compound lens system, is mounted to view this object-region illuminated by the light source to focus an image of the document onto film. The minimum angle between any light ray emanating directly from any part of the light source, and its reflected ray, is great enough to avoid imaging any part of the light source onto the film; thus the critical angle, which is a little over 44 degrees for light traveling in air, is always avoided in the photocopy arrangement by positioning the light source sufficiently to one side of the lens.

The light source is located a relatively small distance away from one edge of the document to be copied, since it is located outside of the critical angle referred to. Thus, one portion of the document to be copied will be more brilliantly illuminated than other portions. (If the light source is made up of two or more groups of bulbs, each located on opposite sides of the lens, the two end portions of the document will be more brilliantly illuminated than the central portion of the document.) A variable density, flat filter is mounted in image-intercepting relationship with respect to the document to be copied. The filter is spaced-apart from the lens at a distance equal to at least about one-fourth of the principal focal length distance from the center of the lens, and is preferably spaced-apart from the lens at a distance appreciably exceeding about one-half of the principal focal length distance from the lens. The filter is constructed to reduce the effective brilliancy of the more brightly illuminated portions of the document to the same effective level as that of the document portions receiving the least light. Since it is obviously undesirable to project an image of the filter itself on the film, the filter must be located at a distance sufficiently great from both the film and the document to avoid such imaging. Furthermore, since the placing of the filter at the location of the lens results in a uniform darkening of the entire image, regardless of the density configuration of the filter, the filter must be located at a sufficient distance from the lens so that it can be at least somewhat selective in the filtering provided. Even then, as will be explained below, the density variations along the flat extant of the filter do not directly correspond to the variations and density compensations desirable at the film.

While the invention is pointed out with particularity in the appended claims, it may be best understood from the following detailed description and drawings, in which:

As is known, in optics, if the angle between a light ray and the reflected ray is appreciably more than 45 degrees, only a relatively small amount of specular reflection is realized. As the angle (A in FIG. 1) is reduced to a point of between 44 and 45 degrees, the amount of specular reflection quickly begins to increase, until at angles of less than around 40 degrees it forms the major portion of the reflection. The foregoing 44+ degree critical angle applies where the medium in which the rays travel is air, as is the case in the usual photocopy camera. The critical angle is less for more dense media; for example, the critical angle is about 41 degrees for a glass medium.

Figure 1:
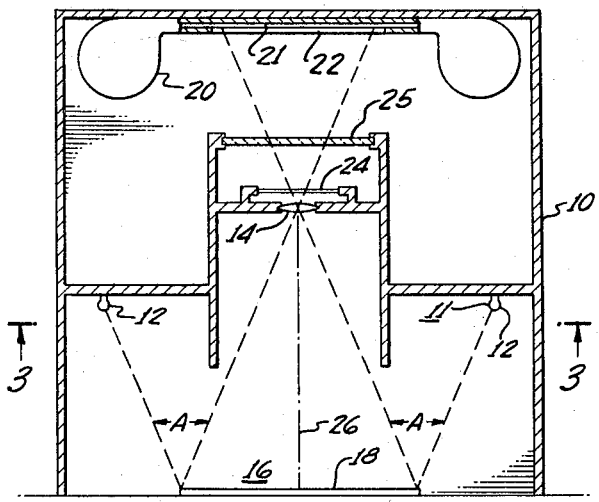
FIG. 1 is a partially schematic plan view of one embodiment of the invention as applied to a photocopy camera characterized in portability and illustrating an aspect of the invention.
Figure 3:
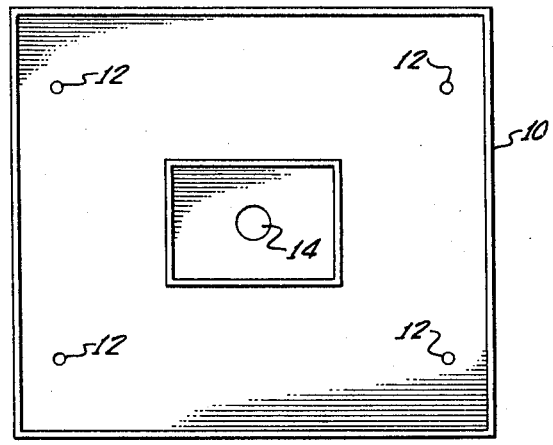
FIG. 3 is a schematic view of a portion of the apparatus illustrated in FIG. 1, taken along lines 3—3 thereof, and depicting the lighting source configuration used.

FIG. 1 illustrates a partially schematic plan view of a photocopy camera 10 embodying the invention. In this figure, the light means or source 11 is made up of four incandescent filament bulbs 12 of the non-frosted or clear glass variety. The schematic view of FIG. 3 illustrates the light bulb configuration used in the embodiment of FIG. 1. As illustrated by the two bulbs 12 shown in FIG. 1, the bulbs are disposed in a bilateral symmetrical arrangement about a central region containing the lens 14.

In the photocopy camera of the invention, the minimum angle A between any light ray emitting directly from any part of the bulb filament, and its reflected ray, is great enough to avoid imaging any part of the light source onto the film. This critical angle is a little over 44 degrees for the photocopy arrangement described, and is preferably in practice at least about 45 degrees in order to avoid specular reflection problems in the copying of glossy documents such as glossy photo prints.

The lens 14 is illustrated in the drawing as comprising a single convex lens. However, it will be appreciated that in actual practice the lens would probably take the form of a compound lens system appropriately corrected. The lens is mounted to view a generally flat object-region 16 within which is to be disposed the document or other material 18 to be copied. The photocopy camera 10 is open on the bottom portion, as illustrated in FIG. 1, in order that it may be visually placed over the object to be photocopied.

The photocopy camera 10 supports a removable film magazine 20 of a type capable of supporting a roll of unexposed film 21 in one generally cylindrical region at one end of the magazine, and is adapted to receive exposed film in a generally cylindrical region at an opposite end of the magazine. An aperture 22 is provided between the two cylindrical regions in order to support the film 21 in a generally flat photo-recording region in image-receiving relationship with respect to the lens 14. While this embodiment is described with respect to a magazine type film supporting system, it is of course realized that any of the other conventional film support systems may be used.

A shutter 24 is mounted between the lens 14 and the aperture 22 defining the region within which the film 21 is supported for exposure. The shutter 24 may be any of the conventional known varieties, and may be controlled in exposure in any of the known manners. Further, while the shutter 24 is described as located behind the lens 14, it may instead be mounted in front of the lens, or may be part of the lens system as a between-the-lens shutter.

A variable density filter 25 of the invention, described in detail below, is mounted in this embodiment between the lens 14 and the photo-recording region 22. As will be explained in greater detail in connection with FIG. 4, the filter 25 is spaced apart from the optical center of the lens 14, at a distance along the lens optical axis, of about one-fourth of the principal focal length distance of the lens 14.

As illustrated in FIG. 1, the object region 16 is located substantially concentric optically with respect to the photo-recording region 22, with the lens system having an optical axis 26 that is optically substantially perpendicular to both the plane of the object region 16 and to the plane of the photo-recording region 22.

Figure 2:
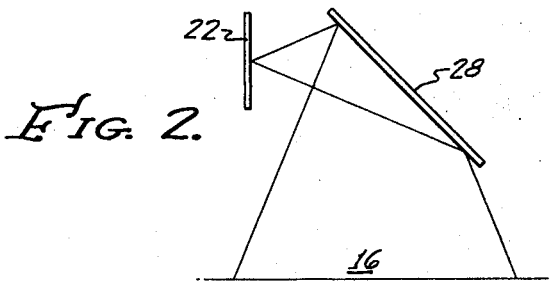
FIG. 2 is a schematic illustration of an embodiment generally similar to that of FIG. 1, but illustrating a folded optical path lens system camera embodying the invention.

As illustrated in FIG. 2, the optical path of the camera lens system may be folded in order to conserve space in directions along its optical axis, but the relationships referred to, and to be described below, are the same optically whether or not the optical path is folded. Thus, as illustrated in FIG. 2, the photo-recording region 22 is physically depicted as being at substantially right angles with respect to the object region 16. However, by virtue of the optical folding provided by a mirror 28, the two regions 16 and 22 are optically generally concentric with respect to each other.

Figure 4:
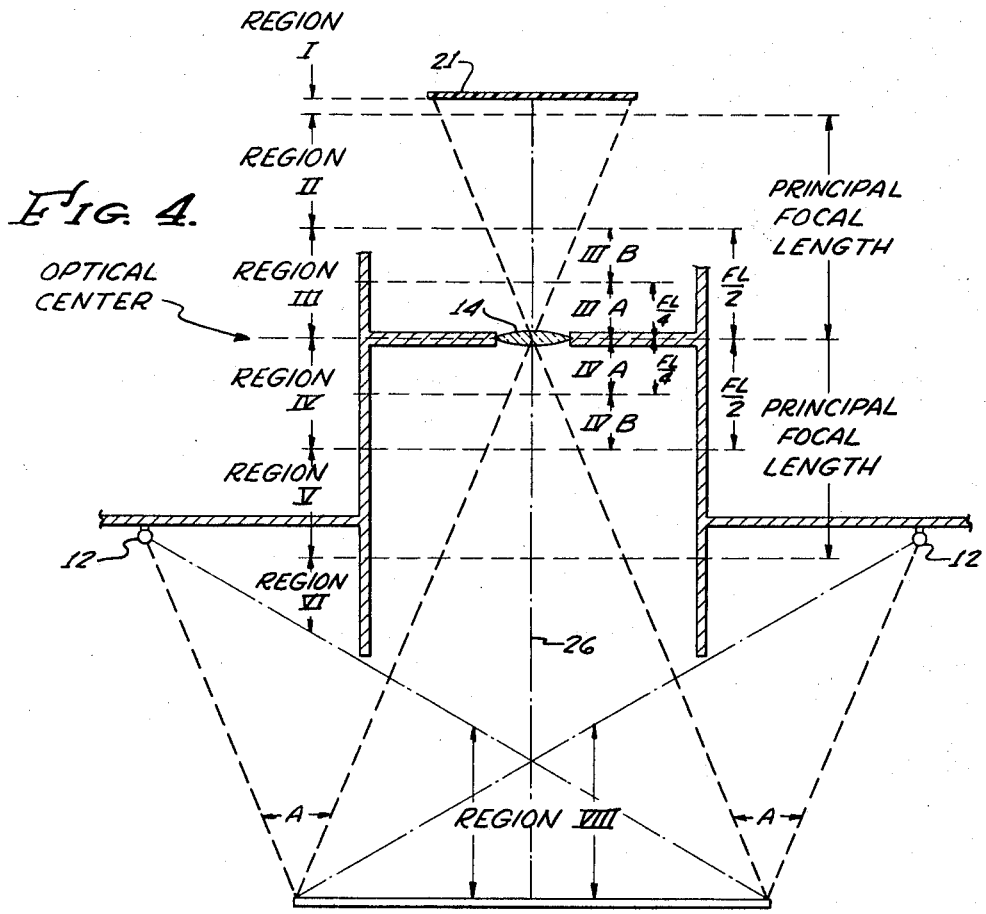
FIG. 4 is a diagrammatic view of the various zone systems applicable to the positioning of the filter of the invention in association with the photocopy apparatus within which it is used.

Reference will now be made to the diagrammatic view of FIG. 4 in explaining some of the aspects of the invention. As illustrated in FIG. 4, the film 21 is mounted to receive an image of the document 18 to be photocopied, by means of the lens 14. Light from an incandescent bulb 12 at various distances along the lens optical axis 26 will now be discussed with a view toward explaining the criticality of the positioning of the variable density filter of the invention with respect to the lens, to the film 21, to the document to be copied 18, and to the light source 12. The lens 14, whether it be a simple lens such as that depicted in the drawing or a compound lens as is normally used, has a predetermined principal focal length. This is the focal length distance of the lens when it views an object at an appreciable distance (i.e., infinity) from it. The actual focal plane of the lens, when a nearby object is viewed by the lens, is further from the lens than when an infinitely distant object is viewed by the lens. Thus the infinite or principal focal length of the lens 14 is less than the distance between the lens and the film in the photocopy camera.

The Regions I, II, and III to be described lie on the minor conjugate side of the lens (i.e., closer to the film) and the regions IV, V, VI and VII lie on the major conjugate side of the lens.

As to Regions I, II, and III, in FIG. 4, the minor conjugate region along the optical axis 26 between the film 21 and the distance of one principal focal length from the optical center of the lens is referred to as Region I. The regions on the minor conjugate or film side of the lens within one principal focal length of the lens are referred to as Regions II and III; Region II is here defined as the distance between half and one full principal focal length from the optical center of the lens, and Region III is defined as the distance between the optical center of the lens and a distance one half the principal focal length from the lens on the film side of the lens. As to Regions IV and V, Region IV, on the major conjugate side of the lens, is defined as the distance between the optical center of the lens and a distance one half the focal length from the optical center of the lens. Region V is defined as the distance on the major conjugate side of the lens between one half and one full focal length from the optical center of the lens. Region VI is defined as bound on one side by the distance on the major conjugate side of the lens more than one principal focal length distance from the lens, and on the other side by Region VIII. Region VIII is defined as the region between the lens and the object to be copied where light makes two passes through the region: one passage of light occurs during its travel from the bulb 12 to the object 18 to be copied, and the second passage of light occurs during the passage through the region from the object to be copied toward the film.

As has been explained above, the light source, bulbs 12, are each located at a relatively small distance away from one edge of the document to be copied. The light bulbs are on the one hand located sufficiently to one side of the lens to exceed the critical angle A referred to, and on the other hand are located relatively close to the object 18 to be copied in order to minimize the overall size of the photocopy apparatus. Thus these edge portions of the document will be more brilliantly illuminated than the other portions. The variable density, generally flat filter 25 referred to in FIG. 1 is constructed to reduce the effective brilliancy of the more brightly illuminated portions to about the same level as that of the document portions receiving the less light.

As a first approximation, one might suppose that the filter should have an actual density exactly inverse to that of the brilliancy of the light illuminating the various portions of the document 18 to be copied. The foregoing exact inverse relationship would hold if the filters were disposed relatively close to either the object 18 or to the film 21, since it is only at these two regions that the image of the document is in focus. However, this is not practically, commercially feasible, since the filters would of necessity be imaged on the film 21 along with the image of the document 18. (While such a filter could be made, the cost would be extremely high, since any local imperfections in the filters would show up on the finished film copy.) Then, too, filters located within Region VII would subject light reaching the document to two passes through the filters, further complicating minor imperfections and scratch problems.

On the other hand, as has been indicated above, light from all portions of the document to be copied passes through all portions of the lens 14. Thus, regardless of the density configuration of any filter, a filter located at the region of the optical center of the lens 14 would uniformly darken all portions of the image. The same phenomenon is true, but to a lesser extent, in regions along the optical axis 26 a short distance from the optical center. Thus, for example, at a very short distance along the optical axis 26 from the optical center, a filter having complete opacity at one portion and complete transparency at another portion would still darken the overall image to a relatively uniform extent, and would not provide the desired selective filtering. This uniform darkening effect gradually diminishes with the distance from the lens optical center. However, at distances within about one fourth of the principal focal length from the optical center of the lens (i.e., Regions III-A and IV-A), the relatively uniform filtering effect is so great as to make these regions very undesirable for the location of variable density filters.

A variable density filter can be used in Regions II, V, and VI to provide the desired compensation for the non-uniform lighting. However, Region II is still relatively close to the film, with the result that abrupt changes in filter density gradients, or other large filter discontinuities will tend to be imaged on the film 21 as localized density anomalies, thus providing a poor quality image. Regions II and V require filters of relatively large dimensions, and are not completely desirable for this reason. Filters for Region VI must be extremely large in physical extent, in order to encompass the entire image, and thus offer an even greater disadvantage in this respect. In contrast to these disadvantages, it should be noted that there is one advantage to the use of a variable density filter in any of these regions. The density variations required for a filter to be located in any of Regions II, V and VI are of the single gradient variety (that is, have a density variation along one dimension only—the dimension along lines perpendicular to the lens optical axis and in the plane of the drawing).

In order to use variable density filters of desirably small sizes, they should be located within regions III-B or IV-B, i.e., at distances of between about one fourth and about one half of the principal focal length distance from the optical center of the lens. Filters located in either of these two regions III-B or IV-B, require density variations in two mutually perpendicular directions along the filter (as illustrated in FIG. 6 described below) and thus may be considered as double gradient filters.

Figure 6:
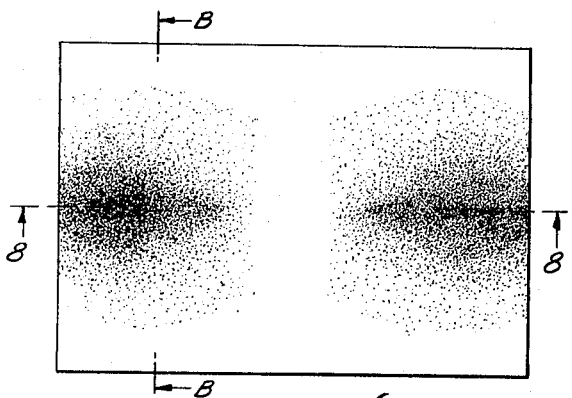
FIG. 6 is a depiction of one practical form of filter useful in a photocopy system of the invention, and exhibiting filtering characteristics generally similar to those of the filter of FIG. 5.

FIG. 6 illustrates a double gradient filter of the type usable in the photocopy camera of FIG. 1 when located in Region III or IV (effectively, Regions III-B and IV-B, since it is undesirable to locate filters appreciably within Region III-A or IV-A). Such a double gradient filter has density variations that may be referred to as having butterfly-like light absorption patterns. The filter portions exhibiting the greater densities compensate for the generally increased illumination provided at regions along the more brilliantly lit portions of the object to be photographed, and take into consideration light loss along the side portions of the object as viewed by the filters (the side portions being the upper and lower edges of the filters depicted in FIG. 6).

Figure 8:
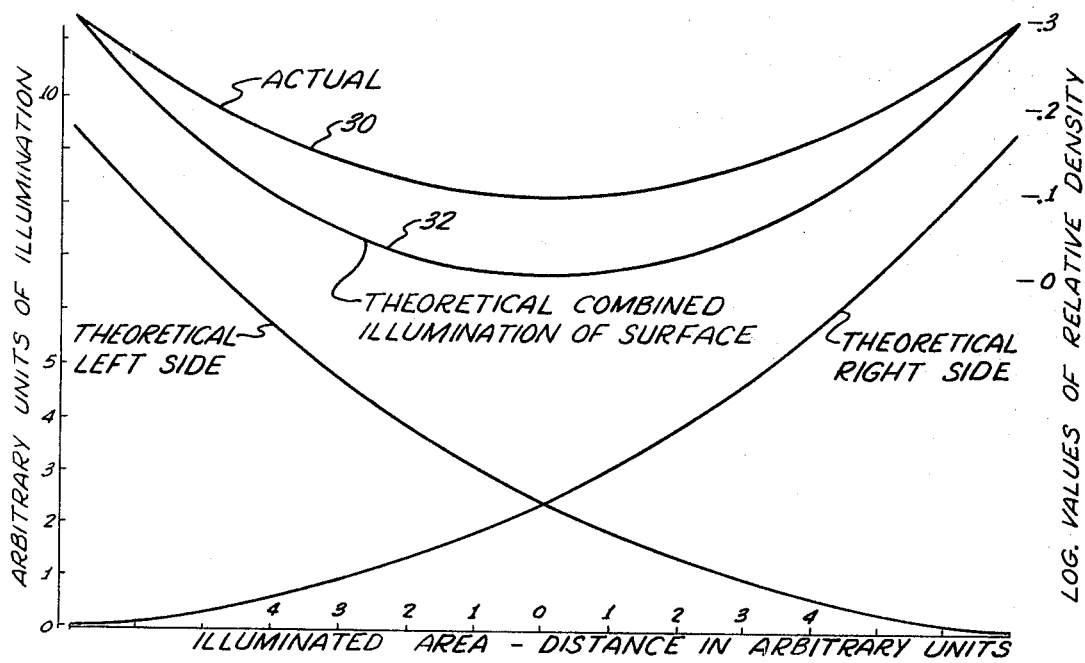
FIG. 8 is a graphical depiction of an aspect of the filter characteristics of the filter of FIG. 5 and is used in describing the invention.

FIG. 8 is a graphical depiction of the illumination levels along the various portions of the filters of FIG. 6 as measured immediately before the light passes through the filter; the view of FIG. 8 is taken along line 8—8 of FIG. 6. As illustrated by the actual illumination level line 30, it will be noted that the illumination is greatest along the end portions of the filter and least along the central portion. The greater illumination level depicted by the actual illumination level line 30, over that which would be predicted from theoretical calculations (line 32), is accounted for by the practical fact that the center of the lens passes more light than the end portion of the lens. This same fact results in a greater amount of light being passed through the center portions of the filter along the line B—B (taken perpendicular to line 8—8 of FIG. 6) than through end portions of the filter along the same line.

Figure 5:
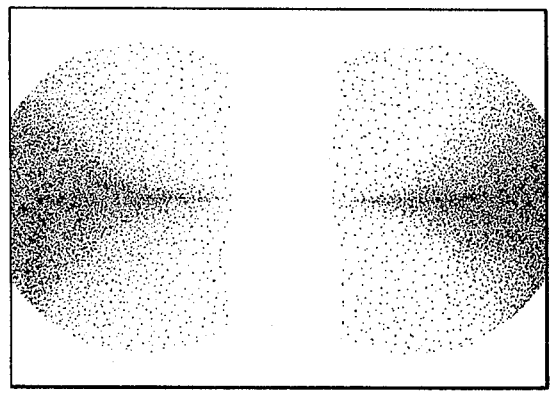
FIG. 5 is a plan view of a filter useful in an embodiment of the invention, and illustrating density variations along different portions thereof.

FIG. 5 illustrates a variation of the filter depicted in FIG. 6, where the two areas of greater density are in the form of arcuate portions of circles. The advantage of the filter of FIG. 5 is that it is usually more easily made commercially than filters of the type depicted in FIG. 5, and notwithstanding its difference in shape, it still exhibits a comparable double gradient filtering capability.

Figure 7:
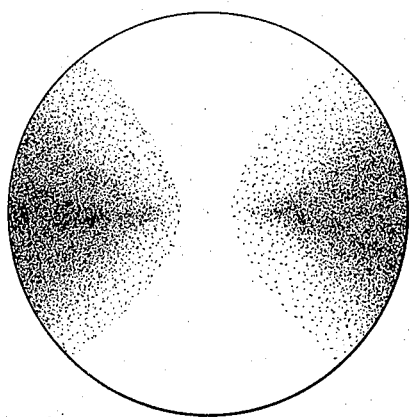
FIG. 7 is a plan view of a filter similar to that depicted in FIG. 6, but having a circular perimeter.

FIG. 7 illustrates a filter similar to that depicted in FIG. 6, but having a circular perimeter. As noted in this figure, double gradient filtering densities are required for filters located within Regions III and IV (less than one half the principal focal length from the optical center of the lens). The circumference or perimeter configuration or outline of the filter is determined by the film or frame perimeter configuration, with the result that rectangular filters would be more commonly used since rectangular film frame configurations are more usual.

Figure 9:
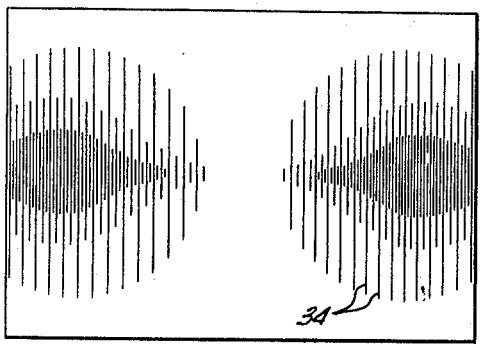
FIG. 9 illustrates yet another filter embodiment according to the invention, and wherein the denser portions of the filter are defined by spaced-apart discrete linear filtering elements.

In the foregoing example, the filters have been described as having a substantially uniform tone or density changes. However, since the filter is not imaged onto the film when the filter is located in Region III or IV (i.e., the filters may be considered to be greatly out of focus), the filter may instead be defined by relatively large number of relatively closely spaced apart, relatively dense regions of high light absorbency. For example, as illustrated in FIG. 9, the filter regions of high light absorbency may be made up of a series of spaced-apart, substantially completely opaque lines 34 of varying length. If the filter is located in the usable portions of Regions III or IV, say, for example, it is spaced about one fourth of the principal focal length from the optical center of the lens, only the average light absorbency over an area containing a number of lines will be viewed by the film. Thus, the filtering efficiency of a filter made up of the discrete, spaced apart elements of FIG. 9 would be relatively the same as that of a comparable continuous tone filter.

It might be noted that the location of a dual gradient variable density filter at a distance from the lens optical center of about one fourth of the principal focal length is a relatively desirable one, since at this distance the filter is far enough from the lens to exhibit selective filtering of different areas (overall light loss of about 50% is typical for a butterfly-shaped filter of the type described, and located at a distance of about one fourth of the principal focal length from the lens optical center); further, at this distance from the lens, the overall size of the filter is still relatively small—i.e., the size of the filter element is not appreciably larger than the size of the lens.

From the foregoing, it is apparent that the invention provides an improved photographic copying means exhibiting the advantages of relative compactness, and yet is able to contain an integral photographic light source and provide uniformly exposed photocopies. While the invention has been described with respect to a portable photocopy camera of a specific design, it will be appreciated that other forms of photocopying apparatus may be constructed using the features of the invention.

What is claimed is:

1. A photo-copying system comprising a self-contained lighting means made up of a discrete number of individual light sources located on opposite sides of a central region; a lens system having a predetermined principal focal length distance and mounted to view a generally flat object-region having a central portion generally concentric with said first-named central region; a film support member mounted to support film in a generally flat photo-recording region in image-receiving relationship with respect to said lens system and object-region; and a generally flat variable-density filter mounted in image-intercepting relationship with respect to said object region, said filter being spaced-apart from said lens system at a distance at least about one-fourth of said principal focal length distance from the center of said lens system and not appreciably exceeding about one-half of said principal focal length distance from the center of said lens system; all of said light sources being mounted in a location relative to said lens system such that the path of all light rays, emanating directly from any portion of said light sources, and corresponding reflected rays define between them angles of at least about 45 degrees; said filter having a generally butterfly-like pattern of greater density than other portions thereof, disposed with respect to the filter portion in image-intercepting relationship with respect to said photo-recording region, with the central and at least some edge portions exhibiting the least density.

2. A photographic system comprising: a lens having a predetemined principal focal length distance, and mounted to receive object-material in an object-region so as to view said material along predetermined paths in directions initiating generally normal to said object-region; at least one light source mounted generally to one side of said predetermined paths and adapted to non-uniformly illuminate said object-region in a predetermined manner; film support means mounted to support film in photographic region in image-receiving relationship with respect to said lens; and a variable density filter mounted in image-intercepting relationship with respect to said lens, and spaced-apart therefrom at a distance less than said principal focal length distance, with said filter having at least one area portion through which passes light emanating from predetermined areas of said object region which are more intensely illuminated than other areas, said one area portion of said filter exhibiting greater densities than other area portions of said filter, thereby normalizing the light received in said photographing region to that which would be generally provided were said object-region uniformly illuminated by said light source.

3. The system claimed in claim 2, wherein said light source comprises two generally symmetrical incandescent lamp groups symmetrically mounted on respective opposite sides of said object-region, and said filter is symmetrical about a line corresponding to a line on said object area which is equidistant from said two lamp groups.

4. In a photo-copying system of the type providing self-contained lighting made up of a discrete number of individual light sources non-uniformly spaced with respect to material to be copied, and where the effect of generally uniform illumination of the material is required, the combination of a lens system having a predetermined principal focal length distance, and mounted to view on an object-region along a predetermined path in a direction initiating generally normal to said object-region; at least two light sources each mounted on one side of said predetermined path generally opposite the other light source, and adapted to non-uniformly illuminate said object-region; film support means mounted to support film in a photographing region in image-receiving relationship with respect to said lens system; and a variable density filter mounted in image-intercepting relationship with respect to said lens system, and lying in a plane generally normal to the paths of light rays passing therethrough, and spaced-apart from said lens system at a distance therefrom of between approximately one-fourth and one-half of said principal focal length distance, said filter having one type of density variation in one linear direction along said generally normal plane of said filter and a different type of density variation in a linear direction perpendicular to said one linear direction and in said generally normal plane, whereby the light received in said photographing region may be normalized closer to that which would be provided were said object-region uniformly illuminated by said light sources.

5. In a photo-copying system of the type providing self-contained lighting made up of a discrete number of individual light sources non-uniformly spaced with respect to material to be copied, and where the effect of generally uniform illumination of the material is required, the combination of a lens system having a predetermined principal focal length distance, and mounted to view an object-region along a predetermined path in a direction initiating generally normal to said object-region; at least two light sources each mounted on one side of said predetermined path generally opposite the other light source, and adapted to non-uniformly illuminate said object-region; film support means mounted to support film in a photographing region in image-receiving relationship with respect to said lens system; and a variable density filter mounted in image-intercepting relationship with respect to said lens system, and lying in a plane generally normal to the paths of light passing therethrough, and spaced-apart from said lens system at a distance therefrom of between approximately one-fourth and one-half of said principal focal length distance, with said filter having a generally butterfly-wing shaped area portion of greater densities than other area portion, whereby the light received in said photographing region may be normalized closer to that which would be provided were said object-region uniformly illuminated by said light sources.

6. A photographic system comprising: a lens means having a predetermined principal focal length distance, and mounted to view object-material in an object-region along a predetermined path in a direction initiating generally normal to said object-region; at least one light source means mounted on one side of said predetermined path and adapted to non-uniformly illuminate said object-region; film support means mounted to support film in a photographing region in image-receiving relationship with respect to said lens means; and a variable density filter mounted in image-intercepting relationship with respect to said lens means, and spaced-apart therefrom at a distance generally one-fourth of said principal focal length distance, with said filter having a generally butterfly-wing shaped area portion of greater densities than other area portions, thereby normalizing the light received in said photographing region closer to that which would be provided were said object-region uniformly illuminated by said light source means.

7. A photographic copying system of the type providing a self-contained lighting source, comprising: a lens having a principal focal length distance, and mounted to view a generally planar object-region adapted to receive material to be photographically copied; at least one light source; film support means mounted to support film in a photo-recording region in image-receiving relationship with respect to said lens and object-region; and a generally planar, multi-gradient variable-density filter mounted in image-intercepting relationship with respect to said object-region, and spaced apart from said lens by a distance exceeding about one-fourth of said principal focal length distance but not appreciably exceeding one-half of said principal focal length distance; said light source being mounted in a location relative to said lens such that the paths of all light rays from said light source, and corresponding reflected rays define between them critical angles of at least about 44 degrees; said filter having a first portion located generally centrally with respect to its generally planar extant and a second portion lying to one side of said first portion, and with the second portion including an area appreciably denser than any area within the first portion, and exhibiting a density gradient in directions along a line joining said first and second portions, and having a third portion lying to one side of said first portion and along a line perpendicular to a line joining said first and second portions, with said third portion exhibiting a density gradient in directions along said perpendicular line that is different from that along the line joining said first and second portions.

8. A photographic copying system of the type providing a self-contained lighting source, comprising: a lens having a principal focal length distance, and mounted to view a generally planar object-region adapted to receive material to be photographically copied; at least one light source; film support means mounted to support film in a photo-recording region in image-receiving relationship with respect to said lens and object-region; and a generally planar variable-density filter mounted in image-intercepting relationship with respect to said object-region, and spaced apart from said lens by a distance exceeding about one-fourth of said principal focal length distance, said light source being mounted in a location relative to said lens such that the paths of all direct light rays from said light source, and corresponding reflected rays define between them critical angles of at least about 44 degrees; said filter having a first portion located generally centrally with respect to its generally planar extant and a second portion lying to one side of said first portion, and with the second portion appreciably denser than the first portion, and having a third portion lying to one side of said first portion and along a line perpendicular to a line joining said first and second portions, with said third portion exhibiting a density appreciably different from those of said first and second portions.

9. A photo-copying system comprising a self-contained lighting means made up of a discrete number of individual light sources generally supported in a single plane and bilaterally symmetrically located on opposite side of a central region; a lens system having a principal focal length distance and mounted to view a generally flat object-region having a central portion generally concentric with said first-named central region; a film support member mounted to support film in a generally flat photo-recording region in image-receiving relationship with respect to said lens and object-region; and a generally flat variable-density filter mounted in image-intercepting relationship with respect to said object region, said filter being spaced-apart from said lens system and located between said lens and said object-region at a distance at least about one-fourth of said principal focal length distance from the center of said lens system and not appreciably exceeding about one-half of said principal focal length distance from the center of said lens system, all of said light sources being mounted in a location relative to said lens system such that the paths of all direct light rays, emanating directly from any portion of said light sources, and corresponding reflected rays define between them critical angles of at least about 44 degrees; said filter having a generally butterfly-like pattern of greater density than other portions thereof, symmetrically disposed with respect to the filter portion in image-intercepting relationship with respect to said photo-recording region, with the central and at least some edge portions exhibiting the least density.

10. A photo-copying system comprising a self-contained lighting means made up of a discrete number of individual light sources generally supported in a single plane and bilaterally symmetrically located on opposite sides of a central region; a lens system having a principal focal length distance and mounted to scan a generally flat object-region having a central portion generally concentric with said first-named central region; a film support member mounted to support film in a generally flat photo-recording region in image-receiving relationship with respect to said lens and object-region; and a generally flat variable-density filter mounted in image-intercepting relationship with respect to said object region, said filter being spaced-apart from said lens system and located between said lens and said object-region at a distance at least about one-fourth of said principal focal length distance from the center of said lens system and not appreciably exceeding about one-half of said principal focal length distance from the center of said lens system; all of said light sources being mounted in a location relative to said lens system such that the paths of all light rays, emanating directly from any portion of said light sources, and corresponding reflected rays define between them critical angles of at least about 44 degrees; said filter having a generally butterfly-like pattern of greater density than other portions thereof, symmetrically disposed with respect to the filter portion in image-intercepting relationship with respect to said photo-recording region, with the central and at least some edge portions exhibiting the least density, the shortest distance between the plane of the individual light sources and a plane containing the generally flat object-region being appreciably less than the distance between the object-region and the photo-recording region along a light path emanating perpendicular from the plane containing the object-region.

11. The system claimed in claim 10, wherein said light sources are incandescant lamps in the form of two banks, the line connecting the center regions of the two banks being generally parallel to a line connecting the densest regions of the two halves of the butterfly-like greater density pattern of said filter.

12. In a photocopying system of the kind including a self-contained lighting means, the combination comprising two spaced-apart light sources forming said lighting means and disposed on opposite sides of an object-region adapted to contain the material to be copied; a lens means mounted to view said object-region and image the object-region in a photo-recording region; and a variable density filter having two portions of greater density than all other light-transmitting portions thereof, and mounted in image-intercepting relationship with respect to said photo-recording region; the orientation of said light sources with respect to said object region being the same as the orientation of said filter portions of greater density with respect to said photo-recording region such that the greater intensity of image-forming light rays resulting from the non-uniformity of the lighting means are subjected to a generally proportionally greater absorption by the non-uniformity of the greater density distribution of the filter.

13. In a photocopying system of the kind including a self-contained lighting means, the combination comprising two spaced-apart light sources forming said lighting means and disposed on opposite sides of an object-region adapted to contain the material to be copied; a lens means mounted to view said object-region and image the object-region in a photo-recording region; and a variable-density filter having two portions, on opposite sides of a central region, of greater density than all other light-transmitting portions thereof, and mounted in image-intercepting relationship with respect to said photo-recording region; each of said filter portions of greater density exhibiting a variation in density along lines perpendicular to a line connecting the centers of said two portions of greater density; the orientation of said light sources with respect to said object region corresponding to the orientation of said filter portions of greater density with respect to said photo-recording region such that the greater intensity of image-forming light rays resulting from the non-uniformity of the lighting means are subjected to a generally proportionally greater absorption by the non-uniformity of the greater density distribution portions of the filter.

14. In a photocopying system of the kind including a self-contained light source mounted to non-uniformly illuminate material to be copied, the improvement comprising a variable-density filter having a generally flat extant adapted to be mounted in image-intercepting relationship with respect to the photocopying of the material to be copied, and having within said extant at least two spaced-apart areas exhibiting an appreciably greater light absorbancy than all other areas within said extant, and with an area between said spaced-apart areas exhibiting at least as low a light absorbancy as any other area within said extant, said two spaced-apart areas and the area between them adapted to be simultaneously in image-intercepting relationship with respect to the photocopying of the material to be copied.

15. The filter claimed in claim 14, wherein said extant is defined by a substantially rectangular-shaped perimeter.

16. The filter claimed in claim 14, wherein the filter light absorbancy is provided by a relatively large number of relatively closely spaced-apart regions of high light absorbancy.

References Cited by the Examiner
UNITED STATES PATENTS

| | | |
|---|---|---|
| 1,254,579 | 1/1918 | Collet. |
| 2,081,329 | 5/1937 | Gordon _____ 88—24 |
| 3,019,703 | 2/1962 | Kilminster _____ 88—24 |
| 3,237,513 | 3/1966 | Dreyfoos et al. _____ 95—10 X |

NORTON ANSHER, *Primary Examiner.*

R. A. WINTERCORN, *Assistant Examiner.*